United States Patent
Chiga

(10) Patent No.: US 6,575,309 B1
(45) Date of Patent: Jun. 10, 2003

(54) FILTER FOR FLUIDS

(75) Inventor: Antonio Chiga, Dammartin en Goele (FR)

(73) Assignee: Filtertek Inc., Hebron, IL (US)

(*) Notice: Subject to any disclaimer, the term of this patent is extended or adjusted under 35 U.S.C. 154(b) by 0 days.

(21) Appl. No.: 09/743,740

(22) PCT Filed: Jul. 13, 1999

(86) PCT No.: PCT/EP99/04893
§ 371 (c)(1), (2), (4) Date: Jan. 10, 2001

(87) PCT Pub. No.: WO00/03784
PCT Pub. Date: Jan. 27, 2000

(30) Foreign Application Priority Data

Jul. 16, 1998 (DE) .................................. 298 12 483 U

(51) Int. Cl.⁷ .............................................. B01D 35/02
(52) U.S. Cl. .................... 210/435; 210/416.4; 210/451; 210/459; 210/461; 210/486; 210/172; 210/232
(58) Field of Search ................................ 210/435, 459, 210/461, 495, 416.4, 484, 486, 172, 487, 451, 346, 232

(56) References Cited

U.S. PATENT DOCUMENTS

| | | |
|---|---|---|
| 1,235,438 A | 7/1917 | Chynoweth |
| 2,381,949 A | 8/1945 | Goodloe et al. |
| 3,826,372 A | 7/1974 | Bell |
| 4,077,887 A | 3/1978 | Langvik |
| 4,159,951 A | 7/1979 | Davis |
| 4,312,753 A | 1/1982 | Bell |
| 4,420,396 A | 12/1983 | Yamamoto et al. |
| 4,561,977 A | 12/1985 | Sasaki |
| 4,617,121 A | 10/1986 | Yokoyama |
| 4,618,422 A | 10/1986 | Sasaki et al. |
| 4,743,370 A | 5/1988 | Mizusawa |
| 4,772,044 A | 9/1988 | Booher |
| 4,783,260 A | 11/1988 | Kurihara |
| 4,851,118 A | 7/1989 | Kurihara |

(List continued on next page.)

FOREIGN PATENT DOCUMENTS

| | | |
|---|---|---|
| DE | 814 362 | 9/1951 |
| DE | 26 58 358 C3 | 6/1978 |
| DE | 34 08 520 A1 | 9/1984 |
| DE | 41 02 474 A1 | 8/1992 |
| DE | 295 18 501 U1 | 2/1996 |
| EP | 0 369 039 A1 | 5/1990 |
| EP | 0 400 170 A1 | 12/1990 |
| EP | 0 475 610 B1 | 3/1992 |
| EP | 0 542 547 B1 | 5/1993 |
| JP | 62 41962 | 7/1987 |
| WO | WO 97/46 800 | 12/1997 |

OTHER PUBLICATIONS

SAE XX Fisita Congress, "The Automotive Future," pp. 2.154–161, May 1984 and translation.

*Primary Examiner*—W. L. Walker
*Assistant Examiner*—Marianne Ocampo
(74) *Attorney, Agent, or Firm*—Brinks Hofer Gilson & Lione

(57) ABSTRACT

The invention relates to a filter for fluids, comprising a plastic supporting body for supporting a filter material. The outer surface of the filter is provided with a pump connection piece, which has a lower end extending in an inner space of the filter, which exhibits an inlet opening. The supporting body is composed of a first part comprising the pump connection piece and of at least a second part, both parts being movably linked to each other through a hinge section so that the at least second part can be positioned angularly in relation to the first part, along with the filtration material, and the first and the at least second parts being initially aligned in a same plane. A locking device is provided to lock the second part in the angular position in relation to the first part.

15 Claims, 2 Drawing Sheets

U.S. PATENT DOCUMENTS

| | | |
|---|---|---|
| 4,874,510 A | 10/1989 | Akira et al. |
| 4,961,850 A | 10/1990 | Combest |
| 5,049,271 A * | 9/1991 | Cain .......................... 210/250 |
| 5,055,187 A * | 10/1991 | Ito et al. ..................... 210/172 |
| 5,084,166 A | 1/1992 | Shiraga et al. |
| 5,169,531 A | 12/1992 | Shiraga et al. |
| 5,174,841 A | 12/1992 | Combest |
| 5,547,568 A * | 8/1996 | Sasaki ........................ 210/250 |
| 5,795,468 A * | 8/1998 | Reising et al. .............. 210/172 |
| 5,928,507 A * | 7/1999 | Chiga ........................ 210/172 |

\* cited by examiner

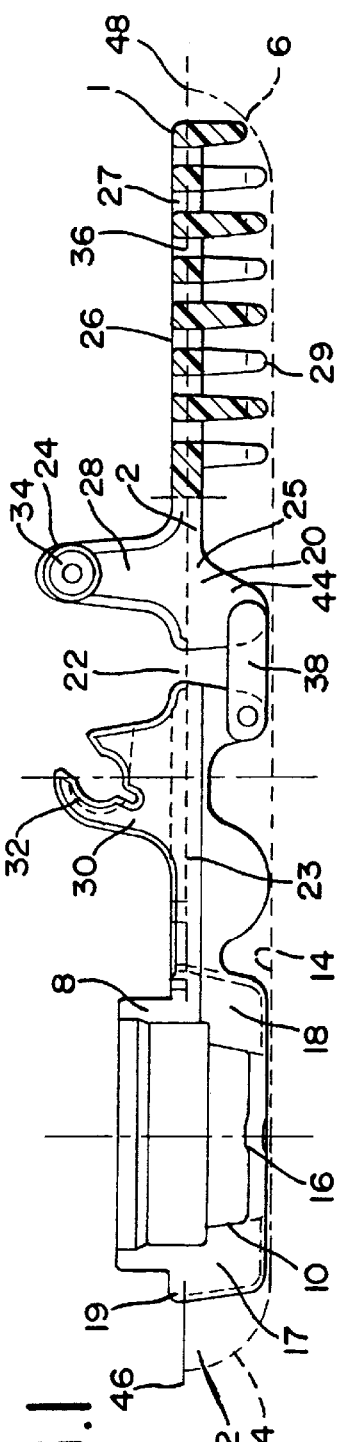
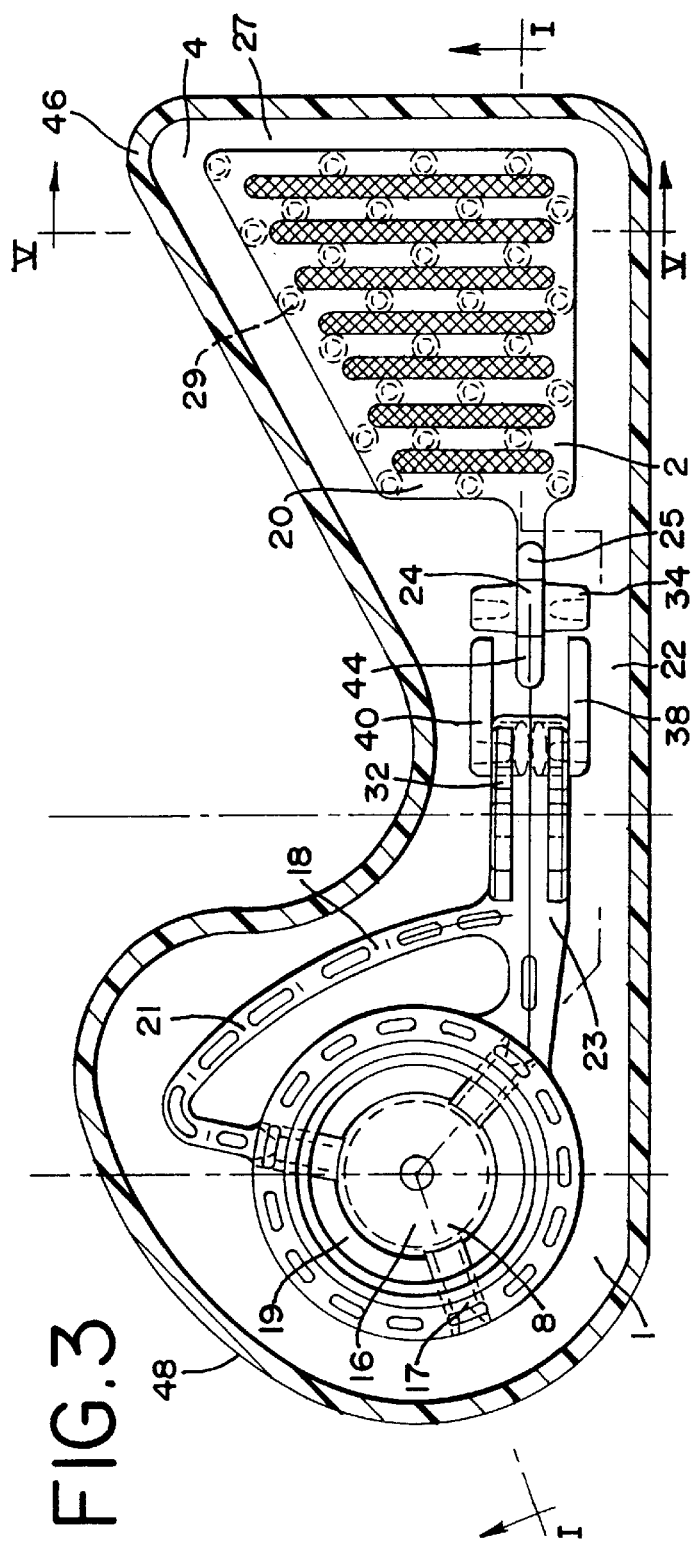

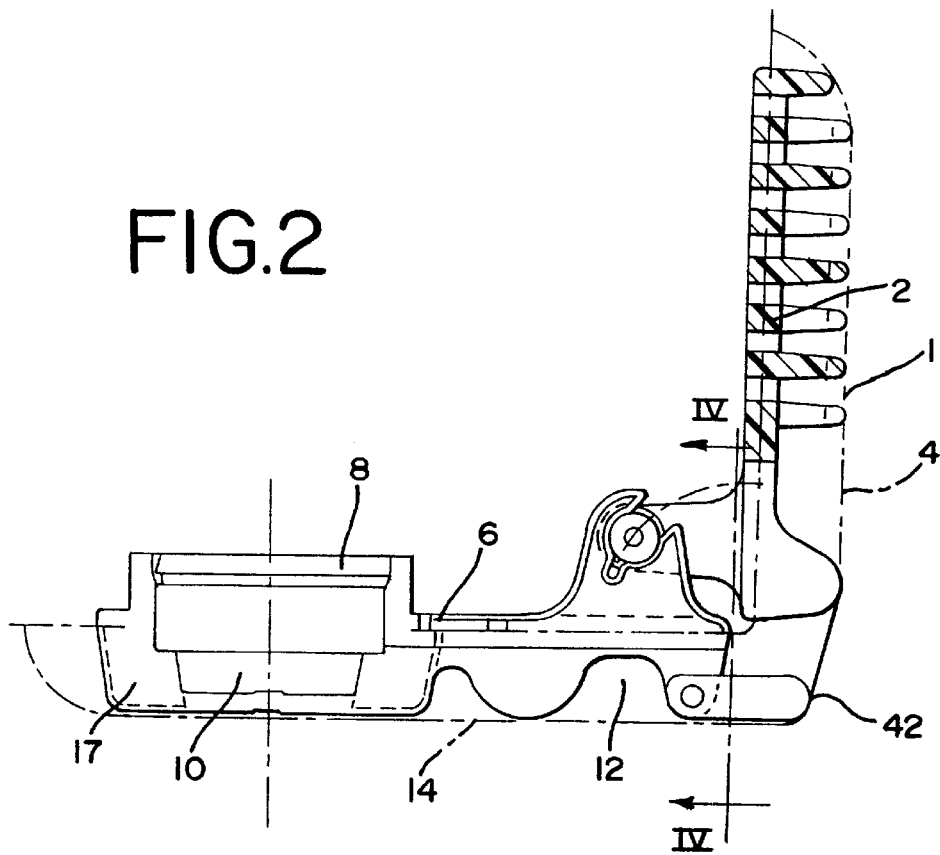
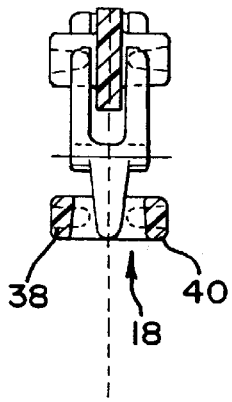
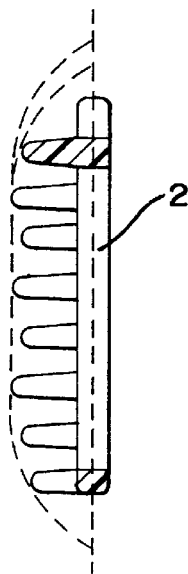
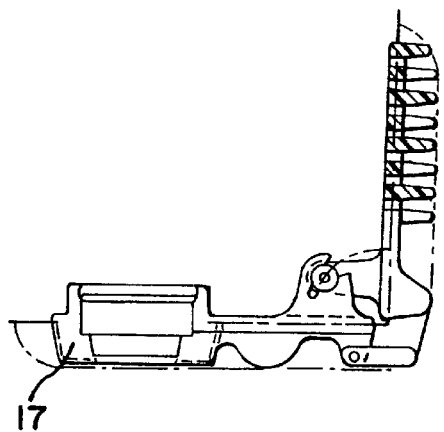

FILTER FOR FLUIDS

FIELD OF THE INVENTION

The invention relates to a filter for liquids, having a supporting body consisting of plastics, which is supporting a plastics filter material and having a pump connection socket positioned on the exterior of the filter, the bottom end of which is extending into the filter close to the bottom thereof comprising filter material and which is having an inlet opening.

BACKGROUND OF THE INVENTION

A filter of this kind being a fuel filter for example is disclosed in DE 39 14 938 C1.

Filters of this kind are characterized by an extremely simple construction and being fuel filters are especially suited to be mounted in a fuel tank of vehicles. The filter function in this connection is provided by the filter material wherein the supporting body has the purpose to keep the top side of the filter body formed by the filter material in a distance from the bottom side, because otherwise the two sides could partially adhere to each other which would lead to a decrease of the provided filter area.

For filters of this basic construction, there are existing several different fields of use, wherein constructions being performed as a fuel filter are usually positioned close to a conveying means, especially a fuel pump which is positioned within the fuel tank, too. At least by a suction line connected to the pump connection socket, the filter is connected with the conveying means.

In many special cases in this connection there is a demand to provide for a filter area as large as possible in a very limited space. In fuel tanks for example, there is the demand to position such filters in a smallest possible suction cavity such that a complete emptying of the fuel in the tank is possible. With known filters, however, due to the minimal necessary filter area there is a limit which was impossible to go below.

The invention therefore has for its task to create a filter of the above defined kind, in which in a very limited area a drastically increased filter area can be provided.

SUMMARY OF THE INVENTION

This task in accordance with the invention basically is solved by the features, that the supporting body is comprising a first part containing the pump connection socket and further at least one second part, that the first part and the second part are movably connected with each other by means of a hinge section by the means of which the at least second part with respect to the first part and together with the filter material can be folded from a linearly extended starting shape of the two parts into an angular position and that further a locking device is provided for fixing the angular position. It is obvious, that by means of this construction the filter has an extremely low space requirement in spite of a large filter area wherein nevertheless the filter can be produced simply and at low costs.

In a preferred embodiment according to the invention, the angular position between the two parts which can be fixed by the locking device is 90 degrees. By this an extremely large filter area in very little space is provided.

According to an advantageous improvement of the invention, the locking device is provided on the exterior of the top side of the filter, wherein further preferably the locking device is consisting of interengaging locking means.

For the sake of simplicity in this connection, preferably the locking means are consisting of a fork shaped member, projecting from the first part on the top side of the filter and of a button shaped member projecting from the second part on the top side of the filter, wherein in the angular position of the parts a formfit and/or a nonpositive connection can be made between said members.

In detail it is further preferred, that the pump connection socket and the two parts of the supporting body are injection moulded onto the filter material forming the top wall of the filter, wherein the first part in the linearly extended shape is connected with the second part only by the filter material. By this in a most simple way, the desired hinge section can be formed without disturbing the function of the filter.

Further, it is of special advantage that the first part of the supporting body in the hinge area and preferably the second part of the supporting body in the hinge area, too, are having supporting arms or -ridges or the like, which in the angular position are supporting the filter material on the exterior radius of the angle.

In an especially preferred embodiment according to the invention, the filter material forming the bottom of the filter is connected with the filter material forming the top wall of the filter only by means of a welded seam forming the circumference of the filter partly or completely. By this the production of the filter according to the invention is drastically simplified.

To provide for an easy movement of the two parts of supporting body with respect to each other, it is further preferred, that the exterior contour of the filter is larger than the supporting body at least in the direction of the movement of the two parts of the supporting body, when establishing the angular position.

BRIEF DESCRIPTION OF THE DRAWINGS

In the following the invention is more detailedly described with reference to an exemplary embodiment shown in the drawings. The drawings show:

FIG. 1 is a lateral partly schematical crossectional view of a practical embodiment of the filter according to the invention in the linearly extended starting shape.

FIG. 2 is a filter according to FIG. 1 after obtaining an angular position

FIG. 3 is an top view of the filter of to FIG. 1.

FIG. 4 is a partly sectional view taken along line IV of FIG. 2.

FIG. 5 is a sectional view taken along the line V—V in FIG. 3 and

FIG. 6 is embodiment of the filter shown in FIGS. 1 to 5.

DETAILED DESCRIPTION OF THE DRAWINGS AND PREFERRED EMBODIMENTS OF THE INVENTION

As shown in the drawings, the filter 1 for liquids, especially fuels, is containing a supporting body 2, consisting of plastics. The supporting body 2 is supporting a filter material 4 to prevent the filter from collapsing when in use.

On the exterior 6 of the filter 1 there is provided a pump connection socket 8 of conventional construction, which with its bottom end 10 is extending into the interior 12 of the filter 1 close to the bottom 14 thereof, which is consisting of filter material.

The pump connection socket 8 is having an inlet opening 16 for the filtered fuel which is surrounded by a number of supporting ribs 17 such that the inlet opening 16 is maintained in a distance from the bottom 14 of the filter 1. By the means of the pump connection socket 8, the filter 1 is connected to the suction side of a fuel conveying means not shown and is forming therewith one unit which is positioned in the interior of a fuel tank (not shown) of a vehicle. The fuel surrounding the filter material 4 is flowing through the filter material into the inlet opening 16 wherein dirt or the like is separated by the filter material 4.

According to the invention the supporting body 2 is consisting of a first part 18 containing the pump connection socket 8 and at least one second part 20. The first part 18 is movably connected with the at least one second part 20 by means of a hinge section 22 such that the at least second part 20 with respect to the first part 18 and together with the filter material 4 can be folded from the linearly extended starting shape of the two parts 18 and 20 shown in FIG. 1 into a preferably 90° angular position as shown in FIG. 2.

For fixing the angular position of the two parts 18 and 20 of the supporting body 2 shown in FIG. 2, there is provided a locking device generally designated by reference numeral 24.

As shown the locking device 24 is provided on the top side 26 of the filter 1 and is consisting of interengaging locking means generally designated by 28 and 30.

In the embodiment shown, the locking means 28 and 30 are consisting of a fork shaped member 32 projecting from the topside of the filter 1 which preferably is in one piece with the first part 18. The corresponding part to the fork shaped member 32 is formed by a button shaped member 34 projecting from the topside 26 of the filter from the second part 20 thereof, which preferably too, is in one piece with the second part 20.

In the angular position of the two parts 18 and 20 of the supporting body 2 shown in FIG. 2 in the embodiment shown, there is a formfit connection between the members 32 and 34 due to the fact, that the button shaped member 34 was snapped into the fork shaped member 32. Alternatively for this purpose, obviously a non-positive connection could be used, too.

In the preferred embodiment as shown in the drawings, the pump connection socket 8 and the two parts 18 and 20 of the supporting body 2 are injection moulded onto the filter material forming the top wall 36 of the filter 1, wherein, as shown, the first part 18 of the supporting body 2 in the linearly extended state is connected with the second part 20 of the supporting body 2, as shown in FIG. 1, only by the filter material 4. The first part 18 in this connection preferably is a unitary member with the pump connection socket 8. Details of the kind of production by injection molding members onto the filter material are in accordance with a previous proposal of the applicant disclosed in EP 0 400 170 B1.

The first part 18 of the supporting body 2 basically is consisting of the angular rib 19 surrounding the pump connection socket 8 and an arcuate rib 21 which is connecting the angular rib 19 with a strut 23. The angular rib 19, the arcuate rib 21 and the strut 23, are formed by injection molding around the filter material 4 and are positioned partly on the exterior of the filter material 4 and partly in the interior 12 of the filter 1. On the bottom side of the parts 19, 21 and 23 the supporting ribs 17 are preferably formed in one piece while on the top side of the strut 23 the unitary fork shaped member 32 is positioned.

The second part 20 being preferably, too, is consisting of a strut 25 which too is formed by injection molding around the filter material 4 and which on its side being on the exterior of the filter material is carrying the button shaped member 34. The strut 25 in one piece is continued in a gridshaped member which, too, is formed by injection molding around the filter material 4. On the bottom side of the gridshaped member 27, there is provided a number of button shaped supporting feet 29 which are preferably unitary with the gridshaped member 27 and which are supported on the bottom 14 of the interior 12 of the filter 1 and therefore are keeping the bottom 14 in a distance from the top side 26 of the filter 1. By the gridshaped member 27 a comparably stiff shape is provided, which is facilitating the pivoting and snapping in of the part 20 into the first part 18.

In the preferred embodiment shown in the drawings on the first part 18 of the supporting body 2 and on the second part 20 of the supporting body 2 each in the hinge section there are provided supporting arms or -ridges 38, 40 and 44, respectively, which are preferably unitary with the respective parts 18 and 20. The supporting arms or -ridges 38, 40 and 44, respectively, have the purpose as this especially can be learned from the view according to FIG. 2 to keep the filter material 4 on the exterior radius 42 of the angular filter supported, which means that in this area, too, an active filter area is maintained.

As can be learned from the views in accordance with FIGS. 1 to 3, the filter material forming the bottom 14 of the filter 1, is connected with the filter material 4 forming the top wall 36 of the filter 1 only by means of a welded seam 46 which is forming the circumference of the filter 1 completely or at least partly. To further not impede the pivoting of the filter 1 from the position in accordance with FIG. 1 into the position in accordance with FIG. 2, the exterior contour 48 of the filter 1 at least in the direction of the ends of the pivoting parts 18 and 20 of the supporting body 2 is larger than the longitudinal extension of the supporting body in this direction.

An important feature of the present invention is formed by the simple way to produce the filter 1 having a comparably complex structure. Firstly the pump connection socket 8 together with parts 18 and 20 of the supporting body 2 as well as all additional supporting ribs or bottoms not described in detail, are injection molded onto a strip or filter material 4 which was drawn through an injection molding tool. Thereafter a second layer of the filter material 4 being the bottom 14 of the filter 1 is welded at the welded seam 46 to obtain the desired filter cavity which by suction previously has been cleaned of loose particles. Thereafter the exterior contour 48 of the filter is stamped out as such contour for example is shown in FIG. 3. After in this way having produced the filter 1 in the linearly extended starting shape in accordance with FIG. 1 only the second part 20 of the supporting body 2 is upwardly pivoted by 90° and the button shaped member 34 is snapped into the fork shaped member 32.

It is obvious that in spite of the complex shape an extremely simply production of the filter is possible.

In the above specification an exemplary embodiment of the filter according to the invention has been disclosed in which the supporting body comprises two parts 18 and 20 which can be pivoted in a hinge section which can be snapped together. Obviously by the basic principle of the present invention embodiments are covered, too in which more than one second part 20 is provided which with respect to the first part 18 is pivotable. In this way the filter area almost deliberately can be enlarged and many different shapes of filters can be provided in which starting out from an extended position which is facilitating the production an operational position is possible and in which a number of second parts 20 are pivoted with respect to the first part 18 carrying the pump connection socket 18.

All details and advantages of the invention which can be learned from the specifications, the claims and the drawing including constructive details and positions in space can be important from the invention singularly as well as in a deliberate combination.

What is claimed is:

1. A filter for fluids having a supporting body, comprised of plastic, supporting a filter material, and a pump connection socket positioned on the exterior of the filter with its bottom end extending into the interior of the filter and a top end having an inlet opening, characterised in that the supporting body comprises a first part with the pump connection socket and at least a second part, wherein the first part and the second part are movably connected with respect to each other by means of a hinge section whereby the at least a second part with respect to the first part together with the filter material can be folded from an extended starting shape into an angular position and a locking device establishing the angular position between the first part and the second part.

2. The filter for fluids according to claim 1, wherein the locking device comprises interengaging locking means for fixing the angular position between the first part and the second part.

3. The filter for fluids according to claim 2, wherein the interengaging locking means comprises a forkshaped member projecting from the first part on the top side of the filter and a button shaped member, adapted for snap fitting into the fork shaped member, projecting from the second part.

4. The filter for fluids according to claim 3, characterised in that the pump connection socket, the first supporting body part, and the second supporting body part are injection moulded onto the filter material part.

5. The filter for fluids according to claim 2, wherein the pump connection socket, the first supporting body part, and the second supporting body part are injection molded onto the filter material of the filter.

6. The filter for fluids according to claim 1, wherein the locking device is provided on the exterior top side of the filter.

7. The filter for fluids according to claim 6, wherein the pump connection socket, the first supporting body part, and the second supporting body part are injection molded onto the filter material of the filter.

8. The filter for fluids according to claim 1 wherein the pump connection socket, the first supporting body part, and the second supporting body part are injection molded onto the filter material of the filter.

9. The filter for fluids according to claim 1 wherein the pump connection socket is injection molded onto the filter material of the filter.

10. A fuel filter connectable to the inlet of a fuel pump comprising:

a. filtration material adapted for folding and defining a filter cavity;

b. a connector for connecting to the inlet of the fuel pump and communicating with the filter cavity;

c. a supporting body comprising a plastic first part injection molded onto the filtration material, and at least a plastic second part injection molded onto the filtration material, wherein the second part is pivotable relative to the first part adjacent the folding portion of the filtration material, whereby the second part is angularly displaced relative to the first part; and d. interengaging locking means for fixing the angular position between the first supporting body part and the second supporting body part.

11. The fuel filter of claim 10, wherein said interengaging locking means includes a fork shaped member and a button shaped member adapted for snap fitting into the fork shaped member.

12. The fuel filter of claim 11, wherein the connector is injection molded onto the filtration material.

13. The fuel filter of claim 10, wherein the connector is injection molded onto the filtration material.

14. A fuel filter connectable to the inlet of a fuel pump comprising filtration material adapted for folding and defining a filter cavity, a connector for connecting to the inlet of the fuel pump and communicating with the filter cavity, a supporting body comprising a plastic first part injection molded onto the filtration material, and at least a plastic second part injection molded onto the filtration material, wherein the second part is pivotable relative to the first part adjacent the folding portion of the filtration material, whereby the second part is angularly displaced relative to the first part; and wherein the first supporting body part further comprises a connection member, and the second supporting body part further comprises a connection member adapted for establishing a non-positive connection with the connecting member of the first supporting body part when the second body part is angularly displaced relative to the first body part.

15. The fuel filter of claim 14, wherein the connector is injection molded onto the filtration material.

\* \* \* \* \*

UNITED STATES PATENT AND TRADEMARK OFFICE
CERTIFICATE OF CORRECTION

PATENT NO. : 6,575,309 B1
DATED : June 10, 2003
INVENTOR(S) : Antonio Chiga

It is certified that error appears in the above-identified patent and that said Letters Patent is hereby corrected as shown below:

<u>Column 5,</u>
Line 33, after "second part", before "." (period), insert -- on the top side of the filter --.
Line 37, delete "part." and substitute -- of the filter --.

Signed and Sealed this

Fifteenth Day of June, 2004

JON W. DUDAS
*Acting Director of the United States Patent and Trademark Office*